Figure 1:
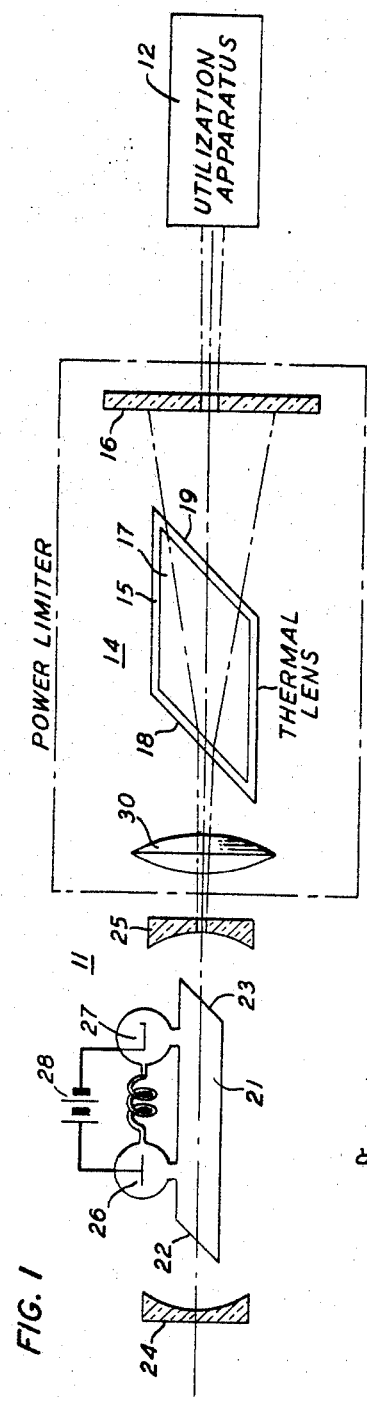

March 25, 1969

T. C. DAMEN ET AL 3,434,779

OPTICAL POWER LIMITER

Filed Feb. 4, 1966

INVENTORS
T. C. DAMEN
R. C. C. LEITE
S. P. S. PORTO

BY *Wilford L. Wisner*
ATTORNEY

United States Patent Office 3,434,779
Patented Mar. 25, 1969

3,434,779
OPTICAL POWER LIMITER
Theodoor C. Damen, East Brunswick, Rogerio C. C. Leite, Fanwood, and Sergio P. S. Porto, North Plainfield, N.J., assignors to Bell Telephone Laboratories, Incorporated, New York, N.Y., a corporation of New York
Filed Feb. 4, 1966, Ser. No. 525,216
Int. Cl. G02f 1/34
U.S. Cl. 350—160    3 Claims This invention relates to the limitation of the power of a beam of coherent electromagnetic radiation.

Coherent radiation is provided at substantial power levels and at various frequencies through the optical portion of the electromagnetic spectrum by devices called lasers. The term "laser" is a well-known acronym for light amplification by the stimulated emission of radiation. Despite its many virtues, the typical laser is subject to appreciable fluctuations in output power as ambient conditions or the applied pumping power change. The typical fluctuation due to these causes is relatively slow, requiring minutes or hours to become appreciable.

These fluctuations in power may not be objectionable for some uses of the coherent electromagnetic wave energy. But for other uses such as communication or the investigation of the properties of matter, it is desirable that the fluctuations be minimized.

To this end, various techniques of power control or limitation have previously been proposed. Among these techniques is automatic negative feedback control applied in various ways to the source of coherent energy. Another technique employs breakdown within an otherwise transparent gas cell cascaded in the path of the beam. The first technique is complicated and expensive; while the second technique is limited to protection of the utilization apparatus and does not permit usable coherent energy to pass to the utilization apparatus during the breakdown condition.

An object of our invention is a simple means of power limitation that continuously provides a usable output at the limited level.

We have discovered that this end can be achieved by cascading in the path of the beam a negative thermal lens, which increases the angle of divergence of the beam as its power level increases, and a device having an aperture that passes selectively the central portion of the beam. In particular, we have discovered that a sufficiently restricted central portion of the beam passed by the thermal lens has a substantially constant power density despite fluctuations in the power level of the beam. Preferably, the aperture passes less than half the incident power of the beam.

For still finer regulation, it is advantageous that the aperture pass less than 30 percent of the power of the beam.

Figure 2:
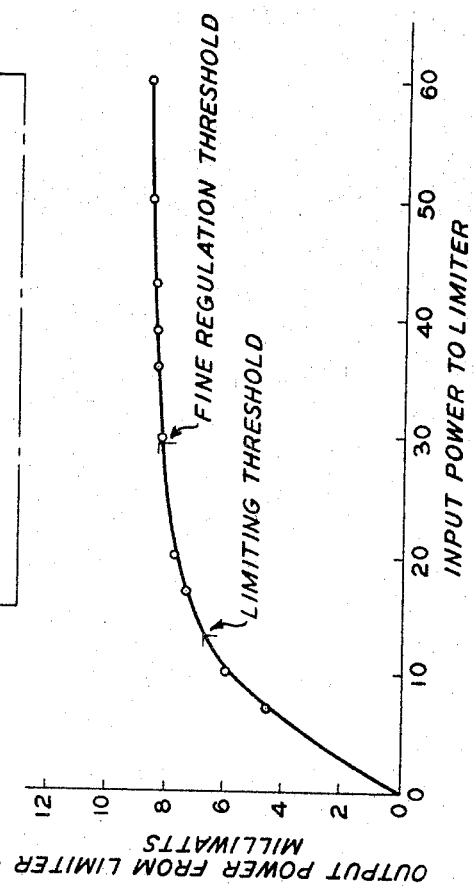

A more complete understanding of our invention may be obtained from the following detailed description and the drawing, in which:

FIG. 1 is a partially pictorial and partially block diagrammatic showing of a preferred embodiment of the invention; and FIG. 2 shows a curve that is useful in explaining the theory and operation of the invention.

In the apparatus of FIG. 1, the laser 11 supplies coherent electromagnetic radiation to the utilization apparatus 12. Interposed between the laser 11 and the apparatus 12 is the power limiter 13 according to the present invention.

The preferred form of the power limiter 13, as built by us, included the fixed lens 30, the negative thermal lens 14 including the thermally responsive fluid 17 in a conventional spectroscopic absorption cell 15, and an opaque plate 16 that had a circular aperture centered upon the axis of the beam passing through thermal lens 14. The circular aperture had a diameter of 3 millimeters, which was appropriate at a spacing of 15 centimeters from lens 14 for passing less than half the minimum normal power of the beam from laser 11. For the particular laser 11 described hereinafter, the fixed lens 30 focused the laser beam to a 0.2 millimeter diameter in the cell 15 at a point on its axis; and the absorption cell 15 was a commercially available Beckman cell 2 centimeters along filled with nitrobenzene.

The laser 11 was an argon ion laser of the type described in the copending patent application of E. I. Gordon et al., Ser. No. 385,159, filed July 27, 1964 and assigned to the assignee hereof. Most other laser sources presently available would be at least as likely to experience fluctuations in output power; and a limiter according to our invention is advantageously employed with any laser source. The laser 11 provides a beam with at least one mode having its maximum intensity on the laser axis. A Gaussian mode is sufficient; but it is also sufficient, instead, that a large number of modes oscillate simultaneously. In our preferred embodiment, the latter was the case.

The utilization apparatus 12 is illustratively a modulator for a communication system. Nevertheless, in the case that the input radiation to limiter 13 is already signal modulated, i.e., by a modulator cascaded between laser 11 and limiter 13, apparatus 12 might be the detector of an optical communication receiver. Alternatively, it could also be a crystal for which the optical properties are being measured. A distinct advantage, in the case that apparatus 12 is a detector, is that the limiter 13 is incapable of following or distorting the relatively rapid signal variations, yet eliminates relatively slow disturbances.

In the operation of the power limiter 13 in conjunction with the laser 11, the power level of the coherent radiation from laser 11 changed as the pumping power applied to laser 11 changed. The limiter 13 provided an output of substantially constant power of about 8 milliwatts.

For the purpose of explanation of the invention, let us examine a typical initial stable condition. During the stable condition, the coherent radiation entered the thermal lens 14; and a small portion of the radiation, less than 0.1 percent per centimeter or 0.001 part per centimeter, was absorbed by the nitrobenzene. The absorbed radiation raised the temperature of the nitrobenzene in the immediate vicinity of the absorption. The temperature gradient with respect to nonabsorbing portions of the nitrobenzene produced heat flow that resulted in a smooth temperature gradient from the axis of the laser beam to the lateral walls of the absorption cell 15.

This temperature gradient in the nitrobenzene was accompanied by density and index of refraction gradients that tended to spread or defocus the laser beam. Although the gradients were typically less strong at the exit end of lens 14, near face 19, than it is at the entrance end, near face 18, the defocusing effect occurred substantially as illustrated in FIG. 1 by the lines marking the outer limits of the beam. The aperture in plate 16 passed only the central portion of the divergent beam to utilization apparatus 12.

This stable condition is represented by the point in curve 41 of FIG. 2 at the lower limit of the portion of the curve labeled "fine regulation threshold." At this operating point, less than 30 percent, namely about 28 percent, of the beam power is passed to the utilization apparatus 12.

A typical change due to a change in pumping power increased the power output of laser 11. The total absorption in the nitrobenzene increased, the temperature and index of refraction gradients increased, and the angle of divergence of the laser beam within lens 14 increased.

We found that when the angle of divergence of the beam thus increased, after the change had stabilized for 0.1 to 10 seconds depending on the magnitude of the change, the power density in the central portion of the beam was substantially the same as it had been before the change started. More particularly, we found that the aperture in plate 16 passed substantially the same power of coherent radiation to apparatus 12 as it passed before the change started.

The regulation characteristics actually measured for the described apparatus of FIG. 1 are shown in curve 41 of FIG. 2.

Throughout the fine regulation range, for an input power ranging from 30 milliwatts to 60 milliwatts, the output power from the aperture increased only from 8.1 milliwatts to 9.0 milliwatts, a change that is just 3 percent of the change in input power.

This regulation is believed excellent for a device of such simplicity.

While a particular embodiment of the invention has been described, many modifications of this embodiment are possible within the spirit and scope of the present invention.

For example, almost any other liquid or gas that is substantially transparent at the wavelength of the laser beam can be employed in the negative thermal lens 14, since nearly all such fluids will have sufficient absorption and sufficiently low thermal conductivity for purposes of the present invention. In fact, we have actually employed absorptions lying in the range from 0.001 part per centimeter to 0.0001 part per centimeter although a much wider range of absorptions is usable, particularly with appropriate changes in the length of cell 15. Although the invention could be employed in a transparent solid, the generally higher thermal conductivity makes the effect weaker.

It is possible to achieve a high degree of limiting even by inserting the thermal lens and aperture within the resonator of the laser, intermediate the laser active medium and the utilization apparatus.

Moreover, appropriate fluids can be found for nearly all known lasers. Still further, the invention can be employed to limit the power of incoherent electromagnetic wave energy. In all these cases, it appears desirable that the aperture pass less than half the normal incident power of the laser beam for coarse regulation, or less than 30 percent for fine regulation.

The above-described modifications are not intended to be exhaustive of those which are within the spirit and scope of the invention.

What is claimed is:

1. In combination, means for supplying electromagnetic radiation in the form of a beam, means for utilizing said radiation, and means intermediate the supplying and utilizing means for limiting the portion of said radiation made available to said utilizing means, said limiting means comprising means for absorbing a portion of said radiation to produce a refractive gradient transverse to said beam to defocus said beam, the amount of defocusing being related to the power level of said beam, and apertured means for passing to said utilizing means a central portion of said beam, which central portion maintains a substantially constant power density as the power level of the radiation fluctuates.

2. In combination, a source of a beam of coherent electromagnetic wave energy of varying power, apparatus capable of utilizing at least a portion of said electromagnetic energy, and a power limiter interposed between said source and said utilization apparatus, said limiter comprising a negative thermal lens and a device having an aperture disposed about the central axis of the beam as it leaves said lens to pass less than half of the power of said beam to said utilization apparatus whenever said power is above a minimum normal value.

3. In combination, a laser capable of supplying a beam of coherent radiation, an apparatus capable of utilizing a portion of said radiation, and a power limiter cascaded between said laser and said apparatus, said power limiter comprising a negative thermal lens including a fluid and in cascade with said lens a device having an aperture positioned to pass the central beam portion comprising less than 30 percent of the power of said beam to said utilization apparatus.

References Cited

UNITED STATES PATENTS 3,297,876   1/1967   De Maria.

OTHER REFERENCES

Marshall et al.: "Use of Electro-Optical Shutter to Stabilize Ruby Laser Operation," Proceedings of the IRE, vol. 50, p. 2108, October 1962.

JEWELL H. PEDERSEN, *Primary Examiner.*

E. BAUER, *Assistant Examiner.*

U.S. Cl. X.R.

331—94.5; 350—175, 179, 206